US008656146B2

(12) United States Patent
Findeisen et al.

(10) Patent No.: US 8,656,146 B2
(45) Date of Patent: *Feb. 18, 2014

(54) COMPUTER SYSTEM COMPRISING A SECURE BOOT MECHANISM

(75) Inventors: Ralf Findeisen, Dresden (DE); Michael Grell, Dresden (DE); Tim Edward Perley, Boulder, CO (US); Marc Edwin Jones, Longmont, CO (US); Frank Schuecke, Dresden (DE)

(73) Assignee: GLOBALFOUNDRIES Inc., Grand Cayman (KY)

( * ) Notice: Subject to any disclaimer, the term of this patent is extended or adjusted under 35 U.S.C. 154(b) by 1568 days.

This patent is subject to a terminal disclaimer.

(21) Appl. No.: 12/186,821

(22) Filed: Aug. 6, 2008

(65) Prior Publication Data

US 2009/0222653 A1 Sep. 3, 2009

(30) Foreign Application Priority Data

Feb. 29, 2008 (DE) .......................... 10 2008 011 925

(51) Int. Cl.
*G06F 9/00* (2006.01)
*G06F 15/177* (2006.01)

(52) U.S. Cl.
USPC ................... 713/2; 713/1; 713/153; 713/160; 713/176; 713/189; 370/351

(58) Field of Classification Search
USPC ........... 713/1, 2, 153, 160, 176, 189; 370/351
See application file for complete search history.

(56) References Cited

U.S. PATENT DOCUMENTS

| | | | |
|---|---|---|---|
| 2001/0007131 A1 | 7/2001 | Galasso et al. | 713/187 |
| 2005/0076226 A1 | 4/2005 | Boivie et al. | 713/187 |
| 2006/0107320 A1* | 5/2006 | Bhatt et al. | 726/22 |
| 2006/0112266 A1* | 5/2006 | Little et al. | 713/161 |
| 2006/0179308 A1* | 8/2006 | Morgan et al. | 713/168 |
| 2007/0192610 A1 | 8/2007 | Chun et al. | 713/176 |
| 2009/0086981 A1* | 4/2009 | Kumar et al. | 380/285 |
| 2009/0172381 A1* | 7/2009 | Zimmer et al. | 713/2 |
| 2009/0276617 A1* | 11/2009 | Grell et al. | 713/2 |

FOREIGN PATENT DOCUMENTS

| | | | | |
|---|---|---|---|---|
| EP | 1 659 472 A1 | 5/2006 | | G06F 12/14 |
| WO | WO 2006/086301 | 8/2006 | | G06F 12/02 |

OTHER PUBLICATIONS

Translation of Official Communication from German Patent Office for German Patent Application No. 10 2008 011 925.3-53 dated Aug. 25, 2008.
Communication pursuant to Article 94(3) EPC from European Patent Application No. 09 716 112.9-2212 dated Apr. 7, 2011.
PCT Search Report and Written Opinion from PCT/US2009/001289 dated Aug. 3, 2009.

* cited by examiner

*Primary Examiner* — M Elamin
(74) *Attorney, Agent, or Firm* — Amerson Law Firm, PLLC

(57) ABSTRACT

A secure boot processing may be accomplished on the basis of a non-volatile memory that is an integral part of the CPU and which may not be modified once a pre-boot information may be programmed into the non-volatile memory. During a reset event or a power-on event, execution may be started from the internal non-volatile memory, which may also include public decryption keys for verifying a signature of a portion of a boot routine. The verification of the respective portion of the boot routine may be accomplished by using internal random access memories, thereby avoiding external access during verification of the boot routine. Hence, a high degree of tamper resistance may be obtained, for instance, with respect to BIOS modification by exchanging BIOS chips.

22 Claims, 6 Drawing Sheets

COMPUTER SYSTEM COMPRISING A SECURE BOOT MECHANISM

BACKGROUND

1. Field of the Disclosure

The present disclosure generally relates to the field of computer systems of enhanced integrity and corresponding mechanisms implemented therein, which may enable the provision of enhanced security standards, thereby enhancing efficiency of applications requiring a secure computer platform.

2. Description of the Related Art

The widespread use of computer systems has led to a significant increase of information processing on the basis of electronic computer systems, thereby involving the creation, distribution and processing of very large amounts of digital data. With the increasing resources of computer systems in view of data storage capacity and increased processing speed, the reproduction of large data sets, such as audio data, movies and the like, has become available for an increasing number of persons and is frequently practiced despite any protective rights, which may be associated with many of the data provided in electronic form. Thus, significant economic damage may be created by the illegal copying, storage and redistribution of electronic data. Furthermore, the distribution of application programs over widespread networks, such as the internet, may also provide the possibility of distributing malicious software applications, which may in turn be used for manipulating data and/or the configuration of a respective computer platform. For example, significant damage may be created in private environments, and in particular in the industry, by introducing software applications which may, for instance, manipulate software files such as stored data, communicate information via the internet without knowledge of the actual user of the platform, start a denial of service attack, thereby possibly rendering the platform to be no longer usable for a dedicated application requiring a specific status of the platform.

For these reasons, great efforts are being made in developing mechanisms for enhancing integrity of the computer platforms to reduce the probability for "successful" external attacks, for instance in the form of malicious software, denial of service attacks, sniffing, spoofing and the like, and also to enhance data integrity with respect to internal manipulations of the computer platform. For example, a plurality of encryption techniques are available, such as symmetric or asymmetric encryption/decryption techniques which enable the exchange of data with a high degree of resistance against tampering data by a third party during the transmission and storage of data. For example, in asymmetric encryption techniques, a pair of a private key and a public key may be used for encrypting data by means of one of the keys and deciphering the data by using the other key, wherein one of the keys may be publicly accessible. Although these techniques may provide enhanced integrity in data communication and data storage, the actual configuration of a computer platform under consideration may still provide the possibility of a plurality of attacks, in particular, as many applications intended for increasing computer security may rely on a trusted platform configuration.

A trusted computer platform may be considered as a computer system in which the hardware configuration as well as the software applications may be assumed to be in a dedicated configuration. However, a secure platform configuration may be established only by establishing a "chain" of trusted platform levels, wherein each subsequent level may be initialized by the preceding level only, if the integrity of the subsequent level has been verified. Hence, the integrity at system level may be preserved through a chain of integrity verifications wherein a root of the chain of verification steps may have to be provided with a high degree of tamper resistance so as to also accomplish a high confidence with respect to integrity of the system after initializing the highest level, i.e., the level of user applications.

In a typical computer platform, the initialization of the system requires various degrees of abstraction, for example with respect to initializing the central processing unit (CPU), initializing the system memory, which is typically provided externally to the CPU, loading an operating system into the system memory from an external mass storage device, and finally executing user applications. Thus, in view of enhancing the overall integrity of the system as a whole, it may not be sufficient to assume that the various system activities prior to loading the operating system can be considered to be secure so as to rely on the integrity of the operating system and the user application, since the operating system may be invoked by a "mistrusted" process, thereby providing the opportunity of manipulating the basic platform configuration by modifying hardware and software components. Hence, the process of initializing the various hardware components of the computer system, such as the system memory and the execution of the instructions contained therein for initializing the higher system levels, which may also be referred to as boot strapping or booting, may have to be incorporated into the chain of trust to provide enhanced overall system integrity.

A typical start sequence for initializing a computer system after applying power or after a reset event causes a "power on self-test" of the CPU, wherein also the processor starts execution of instructions at a dedicated entry address that is indicated by the processor's reset vector. That is, after an initial processor self-test, the execution of instructions may start at the entry point which may typically be an address of a software routine, frequently referred to as BIOS (basic input/output system), which may be stored in a dedicated external non-volatile memory of the computer platform. Under the control of the BIOS, the remaining self-test may be performed and the hardware configuration of the platform may be determined or "measured." Thereafter, a search for a bootable device may be performed, such as a mass storage device, for instance the hard disk of the computer system, a disk, a CD-ROM, an extension card and the like, from which a primary boot block may be loaded into the system memory, wherein control is then passed to the primary boot block, which may load an operating system into the system memory.

Although great efforts have been made in also enhancing security of the entire boot process, it is difficult to provide a reliable core root of trust for measurement (CRTM) for the boot process, for example in view of platform modifications such as replacement of the non-volatile memory chip including the BIOS software, since a corresponding chip replacement may therefore interrupt the chain of trust, thereby also rendering all subsequent verification steps as not trustworthy.

The present disclosure is directed to various devices and methods that may avoid, or at least reduce, the effects of one or more of the problems identified above.

SUMMARY OF THE DISCLOSURE

The following presents a simplified summary of the disclosure in order to provide a basic understanding of some aspects disclosed herein. This summary is not an exhaustive overview, and it is not intended to identify key or critical elements of the invention or to delineate the scope of the invention. Its sole purpose is to present some concepts in a simplified form as a prelude to the more detailed description that is discussed later.

Generally, the present disclosure relates to devices and mechanisms for enhancing integrity of computer systems by establishing a static root of trust for measurement in that a certain set of data is provided that may include executable instructions and data values, which may be accessed by the microprocessor at start up in any case without providing the possibility of circumventing access to the dedicated data set so that a defined root for the initialization of the platform is obtained. Furthermore, the set of data is implemented in such a manner that a high level of resistance against any attacks for manipulation may be achieved. During execution of instructions contained in the set of data, the corresponding routine may not be changed or interrupted, thereby providing a high degree of integrity of this set of data, which may thus be considered as a pre-boot set of instructions and data values. Since processing of the respective instructions of the pre-boot data is mandatory at the start up time of the system under consideration, a chain of trusted software may be started, thereby enabling establishment of a high degree of system integrity, since the dedicated set of pre-boot data represents the static core root for the chain of subsequent verification steps. For this purpose, the pre-boot data set may be maintained in a non-volatile memory in the CPU core itself, thereby substantially avoiding any attacks with respect to replacing BIOS chips and the like.

One illustrative method disclosed herein relates to starting a computer system. The method comprises accessing a first set of data stored in a non-volatile memory area of a central processing unit (CPU), wherein the first set of data includes first instructions causing a core circuit of the CPU to initialize a random access memory of the CPU. The method further comprises loading an image of a second set of data from a non-volatile memory into the initialized random access memory, wherein the second set of data comprises a signature for verifying integrity of the second set of data and further comprises second instructions that cause the CPU to initialize a system memory of the computer system. Moreover, the method comprises verifying the integrity of the second set of data by using the signature and a decryption key included in the first set of data. Finally, the method comprises initializing the system memory using the second instructions when verification of the second set of data has been successful.

A further illustrative method disclosed herein relates to starting a computer system and comprises, upon at least one of a power-up event and a reset event, accessing an internal non-volatile memory of a CPU. The non-volatile memory contains pre-boot instructions and data values for initializing an internal random access memory of the CPU and for verifying an integrity of at least a portion of boot instructions and boot data values stored in a non-volatile memory of the computer system. The method further comprises loading the portion of the boot instructions and boot data values from the non-volatile memory into the internal random access memory by executing the pre-boot instructions. Moreover, integrity of at least a portion of the boot instructions and boot data values is verified by executing the pre-boot instructions. Finally, the method comprises, after successfully verifying integrity of the at least a portion of the boot instructions and boot data values, executing the boot instructions.

One illustrative central processing unit (CPU) disclosed herein comprises a substrate having formed thereon circuit elements defining a CPU core, a random access memory, a non-volatile memory and a bus system for connecting the CPU core, the random access memory and the non-volatile memory. Furthermore, the CPU comprises pre-boot information stored in the non-volatile memory, wherein the pre-boot information includes instructions executable by the CPU core and also comprises data values for initializing the volatile random access memory and verifying at least a portion of a boot routine to be supplied from an external memory device.

In a further illustrative aspect disclosed herein, the central processing unit described above may be a part of a computer system comprising, in addition to the CPU, a system memory, a memory device containing the boot routine and an interface system for connecting the system memory and the memory device including the boot routine with the CPU.

BRIEF DESCRIPTION OF THE DRAWINGS

The disclosure may be understood by reference to the following description taken in conjunction with the accompanying drawings, in which like reference numerals identify like elements, and in which.

Figure 1A:
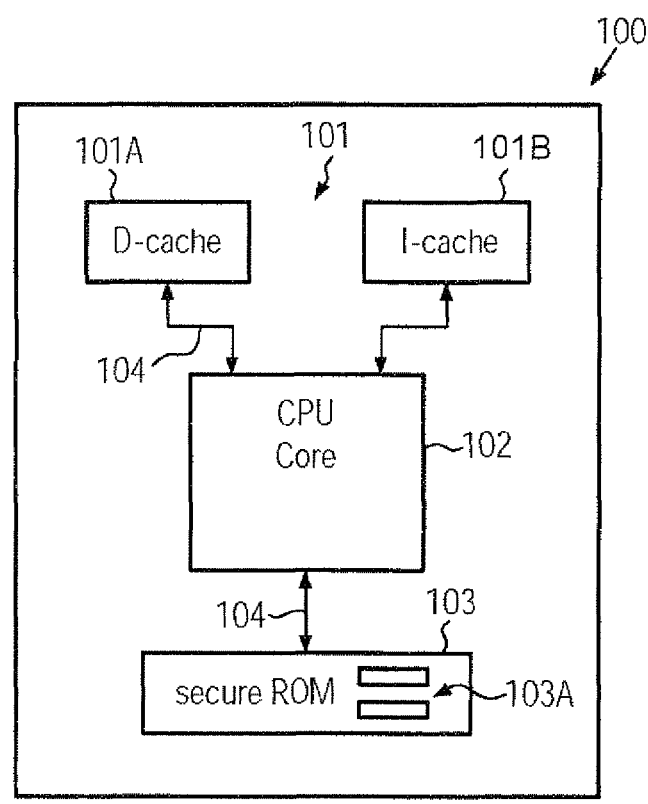
FIG. 1a schematically illustrates a central processing unit (CPU) including a random access memory (cache), a CPU core and a non-volatile memory including pre-boot information, according to illustrative embodiments.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Various illustrative embodiments are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. Various structures, systems and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Generally, the present disclosure provides a system and a mechanism for executing, at start up or reset or any other operational state requiring an initialization of the system, instructions and using data stored in a non-volatile memory representing a part of a central processing unit, thereby significantly reducing the possibility of manipulating the set of data included in the non-volatile memory. Consequently, the contents of the non-volatile memory may be used as a static root of trust for measurement during the initialization of the CPU and the entire computer system by ensuring that, upon power-up or reset of the CPU, the first instruction is fetched from the non-volatile memory. Thus, the set of data contained therein may serve as a pre-boot or pre-BIOS component which may enable the initialization of further system components, such as an internal random access memory, which may be used for storing operational data like variables and stack and instructions for running a portion of BIOS software. For instance, the data cache as part of the random access memory area and an instruction cache may be initialized by the pre-boot data of the internal non-volatile memory, thereby substantially avoiding the possibility of external access to data contained therein during the initialization process. That is, the random access memory area, i.e., the data cache and the instruction cache, are CPU-internal components and unwanted manipulation may be very difficult, in particular as the external system memory is not initialized at this stage. Depending on the storage capacity of the random access memory, the BIOS routine may be divided into two or more portions such that verification of one or more signatures in view of BIOS integrity may be performed in the random access memory for the first portion that is configured to have a size so as to fit into the instruction cache. Thus, this portion of the boot information may, after verifying the integrity thereof, be executed directly from the random access memory. Consequently, during initialization of the random access memory and loading the portion of the boot information by executing the pre-boot instructions, the pre-boot information may not be accessed externally, thereby substantially avoiding any manipulation of the first signature verification process. In some illustrative embodiments, the pre-boot information may be accessed after signature verification by an external application, for instance for accessing decryption keys for evaluating the integrity of BIOS upgrade versions and the like.

Consequently, after signature verification of the first portion of the boot information, flow control may be passed to this portion and the further boot processing may be continued by initializing the system memory and copying the remaining boot information while also verifying integrity of the further portion of the boot information. Consequently, the data, i.e., the instructions and data values, contained in the non-volatile memory provided as an integral part of the CPU may be used as a static core root of trust for measurement, thereby providing a computer platform in which a tamper-resistant hardware and software configuration may be achieved. In particular, in view of attacks, such as replacement of the BIOS chip, the mechanism of embodiments disclosed herein may provide enhanced security for typical practical applications which use the platform in the context of financial transactions or digital rights management, which may be based on the requirement of a trustworthy computer platform.

FIG. 1a schematically illustrates a central processing unit (CPU) 100 according to illustrative embodiments in which a core root of trust for measurement (CRTM) is implemented with a high degree of tamper resistance. The CPU 100 may comprise a CPU core 102 which may include components for data processing, such as performing arithmetic operations, logic operations and the like. The CPU core 102 is functionally connected to a random access memory 101 which may comprise a plurality of static RAM cells and the like, as is compatible with the overall configuration of the CPU 100. In one illustrative embodiment, the RAM 101 may comprise a first memory portion, also indicated as data cache 101A, and a second portion indicated as instruction cache 101B. For example, the RAM 101 may be implemented in a fast memory technology to enhance the overall performance of the CPU 100, as is typically required in sophisticated integrated circuits. It should be appreciated, however, that any appropriate memory technology may be used for the memory 101 as long as direct control of the memory 101 via the CPU core 102 may be accomplished without the possibility of external access during initialization of the CPU 100.

Furthermore, the CPU 100 may comprise a non-volatile memory 103, which may be provided in any appropriate memory technology, for instance in the form of a flash memory or any other read-only memory technique, which may not enable external access for modifying the contents of the memory 103. Hence, the memory 103 may be considered as a secure memory area, the contents of which may therefore represent a static root of trust. For this purpose, a set of data 103A, which is to be understood as instructions executable by the CPU core 102 and data values representing operands and the like of the instructions, is provided, at least in a portion of the memory 103, which may not be overwritten with new data once the respective portion of the memory 103 is programmed. The memory 103 containing the set of data 103A may be connected to the CPU core 102 by means of a bus system 104 such that, upon power-up or reset, a jump to a specified address of the memory 103 is performed. Consequently, a "hard-wired" target for a reset vector of the CPU core 102 may be provided which ensures that execution of instructions may start from the secure memory 103, at least for a power-up event and a reset event.

It should be appreciated that the CPU 100 may be formed on the basis of sophisticated semiconductor manufacturing techniques in which an appropriate carrier material, such as a semiconductor substrate and the like, may receive a plurality of circuit elements formed on the basis of a technology under consideration, such as CMOS processes and the like, in which transistor elements, capacitors, resistors and the like may be formed in accordance with a specific device architecture for the CPU 100. In the embodiment illustrated here, the various components of the CPU 100 may therefore be formed on a common substrate during a common manufacturing process flow, thereby providing the memories 101 and 103 as internal or integral components of the device 100. For example, respective manufacturing techniques are well established in which volatile and fast memory cells may be formed together with non-volatile memory cells and high performance logic gates as may be required in the CPU core 102. Additionally, appropriate mechanisms may be provided such that, after programming the memory 103, or at least a portion thereof, including the set of data 103A, further access for changing data bits may be prevented so as to provide a protected environment for the data set 103A.

Figure 1B:
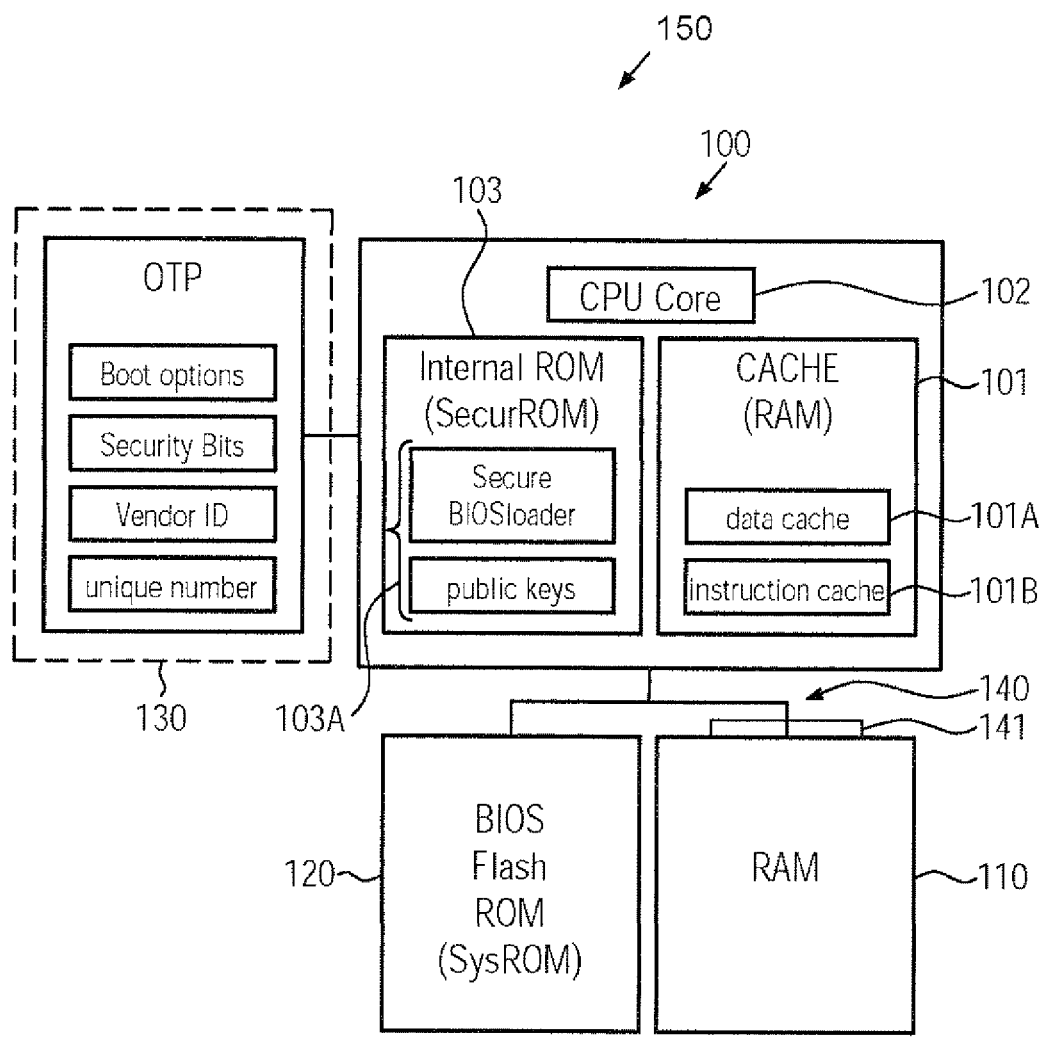
FIG. 1b schematically illustrates a computer system including a CPU including internal pre-boot information, according to other illustrative embodiments.

FIG. 1b schematically illustrates a computer system 150 comprising the CPU 100 providing the protected environment for the set of data 103A, as previously explained, wherein, in the embodiment shown, the CPU 100 may comprise the random access memory 101 in the form of the data cache 101A and the instruction cache 101B, which may have a size of, for example, 64 kB so as to accommodate a portion of boot information and to act as a "system RAM" when performing instructions of the data set 103A. Similarly, the instruction cache 101B may be provided with a size of 64 kB, wherein it should be appreciated that any other appropriate memory size may be used that is compatible with the size of a respective portion of boot information that is to be performed from the memory 101 during a verification process. Similarly, the internal non-volatile memory 103 may be provided with any appropriate size, for instance 32 k, so as to be compatible with the requirements for the data 103A representing the core root of trust for measurement for the computer system 150. For example, the set of data 103A may comprise instructions and data values representing a secure load routine for loading a respective portion of boot information into the internal memory 101 for performing a verification process. Additionally, the set of data 103A may comprise one or more decryption keys which may represent public keys of an asymmetric encryption/decryption algorithm so as to enable a signed portion of the boot information to be verified within the memory 101. It should be appreciated that the number of public keys in the data set 103A may be selected in accordance with safety considerations, for instance in view of maintaining an appropriate infrastructure for providing respective key pairs with a high degree of integrity and the like.

The computer system 150 may further comprise a system memory 110, for instance in the form of any appropriate memory device including random access memory cells, such as dynamic RAM cells and the like. The size of the system memory 110 may be adapted to the requirements of the system 150 in view of performance and storage capacity. Furthermore, the system 150 may comprise a non-volatile memory 120, such as a flash memory and the like, which may include information, also referred to as BIOS information, at least a portion of which may be a signed portion, that is, the signed portion may comprise a signature obtained on the basis of an appropriate hash algorithm in combination with an encryption mechanism, for which one or more appropriate decryption keys may be contained in the set of data 103A, as previously explained.

In one illustrative embodiment, the non-volatile memory 120 may contain the boot information that is divided into two portions, wherein a first portion may comprise data and instructions for initializing other system components, such as the system memory 110, for accommodating the second portion of boot information and executing the second portion once the first portion has been verified on the basis of the protected environment provided by the CPU 100. A more detailed configuration of the boot information within the non-volatile memory 120 will be described later on with reference to FIGS. 1c and 1d.

The computer system 150 may further comprise an interface system 140 configured to operatively connect the system memory 110 and the non-volatile memory 120 with the CPU 100. In one illustrative embodiment, the system 150 may further comprise a one-time programmable memory 130, which may include platform-specific information, for instance about boot sources and related parameters. For instance, as shown, the one-time programmable memory 130 may comprise information concerning boot options in order to indicate to the CPU 100 whether to boot from the internal memory 103 or not. Furthermore, security bits provided in the memory 130 may include a respective bit that determines where the initial instruction fetch of the CPU 100 after reset is rooted to. For example, with this bit set to "1," execution may be passed to the internal memory 103, thereby enabling secure boot processing. In some instances, it may be desirable to disable the secure boot functionality for development/debug purposes. In other cases, depending on platform requirements, it may also be desirable to disable or bypass trusted platform security features. In this case, a change of the state of this bit may not be allowable during the secure boot processing. For this purpose, all debug modes (JTAG, . . . ) are disabled at least during the boot time. After disabling respective debug modes, execution of the secure boot process may be performed, as will be described later on in more detail. Similarly, the memory 130 may include a bit for controlling debug features during the secure boot process, which may be advantageous during development periods, while, for production, a respective control of debug features is to be disabled. In addition to these security bits, the memory 130 may comprise other information, such as the vendor identification or any unique number which may be usable for digital rights management applications and the like. It should be appreciated that, in other illustrative embodiments, the one-time programmable memory 130 may be omitted or may be provided so as to include other information controlling the secure boot processing during development and actual application.

Figure 1C:
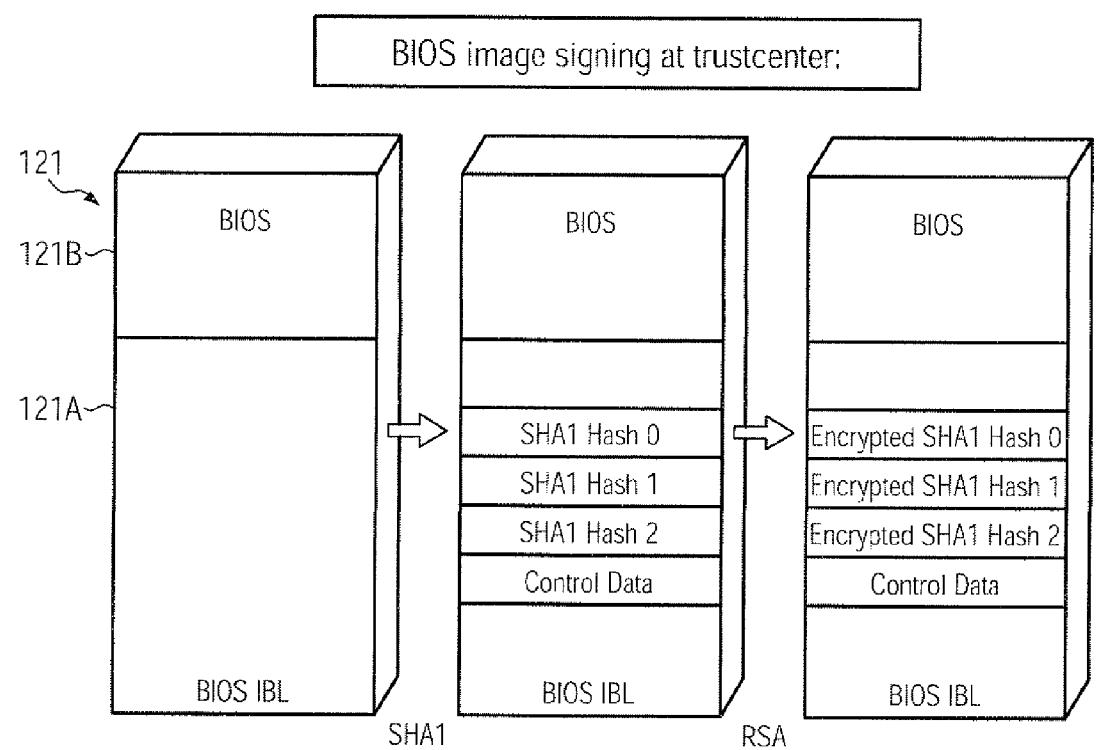
FIG. 1c schematically illustrates process steps for manipulating bootstrap data including instructions and data values during a process for creating a signature of a first portion of the boot information, according to illustrative embodiments.

FIG. 1c schematically illustrates the configuration of boot information 121 that may be stored in the non-volatile memory 120. In the embodiment shown in FIG. 1c, the boot information 121, which may also be referred to as BIOS, may comprise a first portion 121A, which may represent a set of data including instructions and data values having a size so as to be compatible with the size of the memory 101, as previously explained. For example, for the above-given exemplary values of 64 kB for each of the RAM areas 101A, 101B, a maximum size of the portion 121A may be restricted to approximately 32 kB. It should be appreciated, however, that any other appropriate size of the portion 121A may be applied, depending on the available amount of storage within the RAM 101. It should further be appreciated that providing the portion 121A may be necessary for boot information 121 which exceeds the size of the memory 101 so that the entire boot processing may not be performed on the basis of the memory 101 since typical boot routines may have a size of several hundred kByte and more. In other cases, when sufficient storage space may be available, the boot information 121 as a whole may be used during the secure boot processing, as will be discussed later on in more detail.

Thus, if the portion 121A may be provided, as shown in FIG. 1c, it may serve as an initial BIOS "loader" for a second portion 121B, wherein the first portion 121A may contain therein a hash value obtained over the portion 121B. The hash value for the portion 121B may also be protected by the signature contained in the portion 121A on the basis of a hash value obtained over the first portion 121A, which may be accomplished in a dedicated trust center. Thus, encryption of the hash value of the second portion may not be necessary. The signature of the hash value(s) for the portion 121A may be used for verifying the portion 121A during a secure boot processing. The portion 121A may therefore be configured to perform necessary platform initialization actions, such as initialization of a memory controller and the like, followed by shadowing the portion 121B from the memory 120 into the initialized system memory 110.

Upon execution of the portion 121A, a hash value may also be calculated over the image 121B copied into the system memory 110, which may then be compared with the hash value initially contained in the portion 121A. Thus, integrity of the portion 121B may be verified on the basis of the hash value contained in the portion 121A, thereby providing a trusted chain of integrity. Consequently, as shown in FIG. 1c, the portion 121A may be processed so as to obtain a signature, which may be accomplished in an appropriate trust center on the basis of an appropriate trustworthy environment. For this purpose, secure hash algorithms may be applied to provide one or more hash values, for instance indicated as hash 0, hash 1, hash 2 in combination with appropriate control data. Thereafter, any appropriate encryption technique may be used, for instance an RSA (Rivest, Schamir, Adelman) algorithm using appropriate private keys, thereby obtaining the encrypted hash values as indicated at the right-hand side of FIG. 1c. As previously explained, an appropriate number of public keys may be contained in the data set 103A thereby enabling a decryption of the encrypted hash values or signatures created during the sequence as shown in FIG. 1c.

Figure 1D:
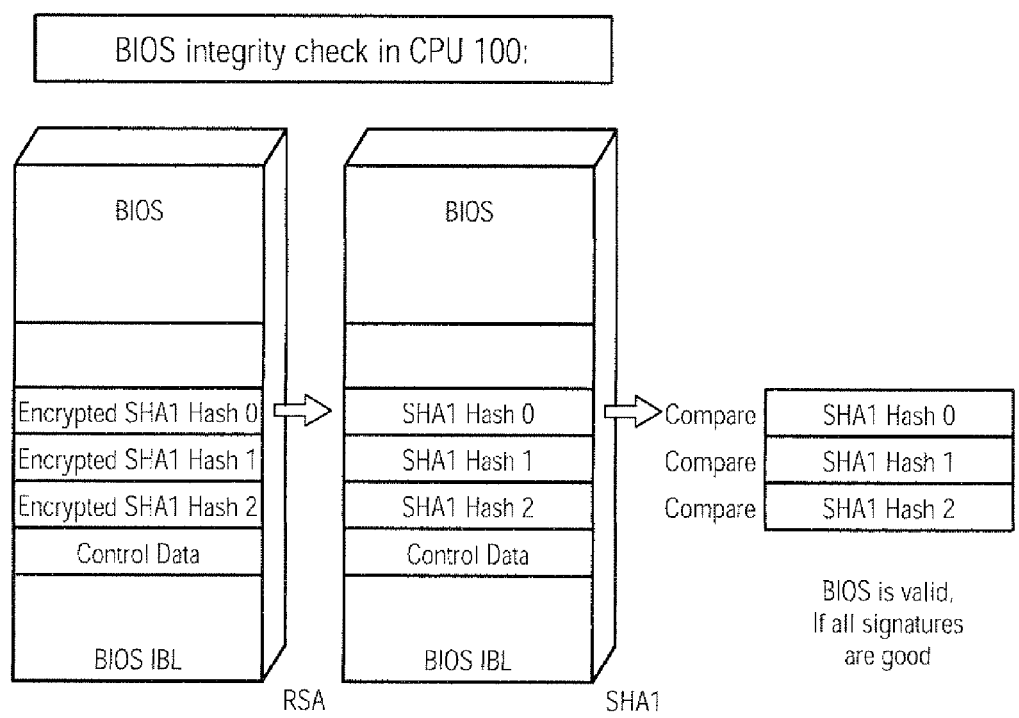
FIG. 1d schematically illustrates a process for verifying a signature of a portion of the boot information, according to illustrative embodiments.

FIG. 1d schematically illustrates a sequence for verifying the signatures contained in the portion 121A, which may be performed on the basis of the data set 103A during start up of the system 150. The verification may be accomplished on the basis of, for example, the RSA algorithm using a public key, thereby obtaining the initially created hash values, such as hash 0, hash 1, hash 2. These initially created hash values may then be compared to respective hash values as may be obtained by applying the appropriate hash algorithm over the portion 121A that is copied into the RAM memory 101. The portion 121A may then be considered as verified if the calculated hash value(s) match with the initially generated hash value(s) obtained by decrypting the signatures in the portion 121A, as shown at the left-hand side of FIG. 1d.

Figure 1E:
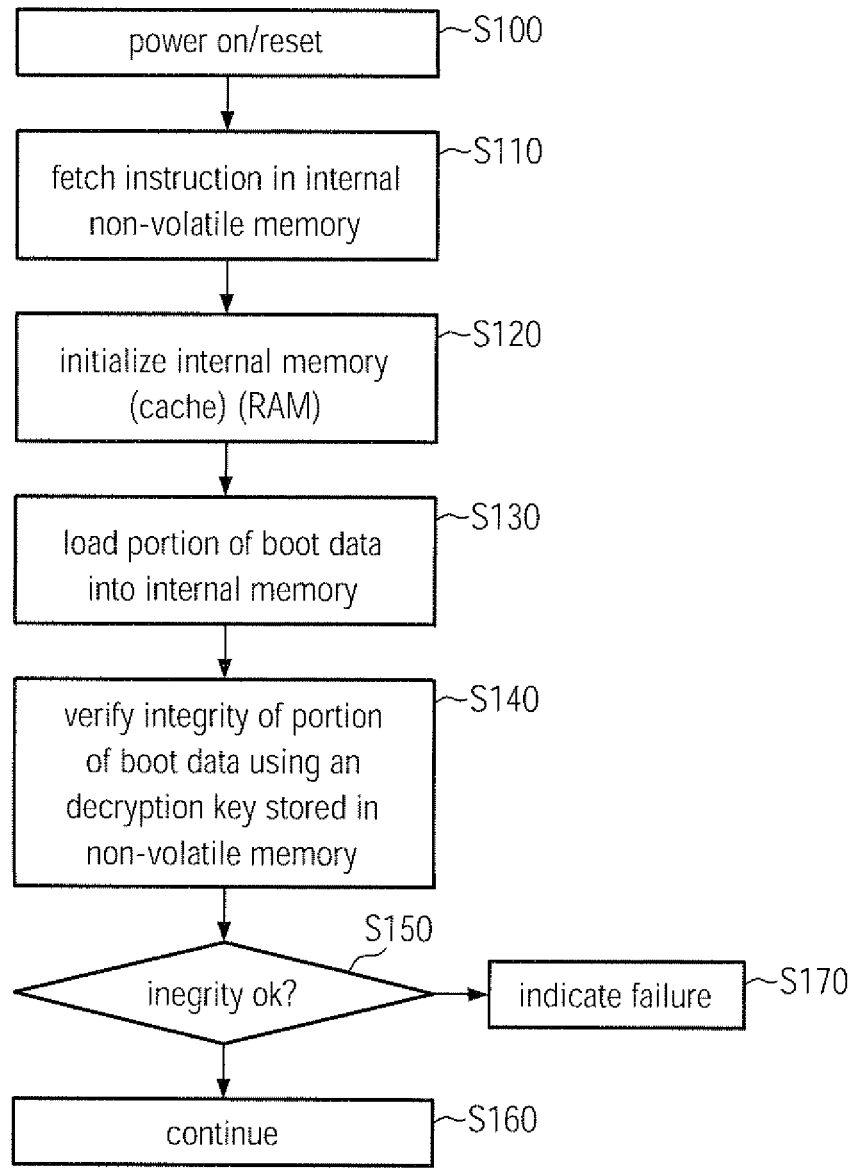
FIG. 1e illustrates a flow diagram for describing operation of the computer system as shown in FIG. 1b, according to one illustrative embodiment.
Figure 1F:
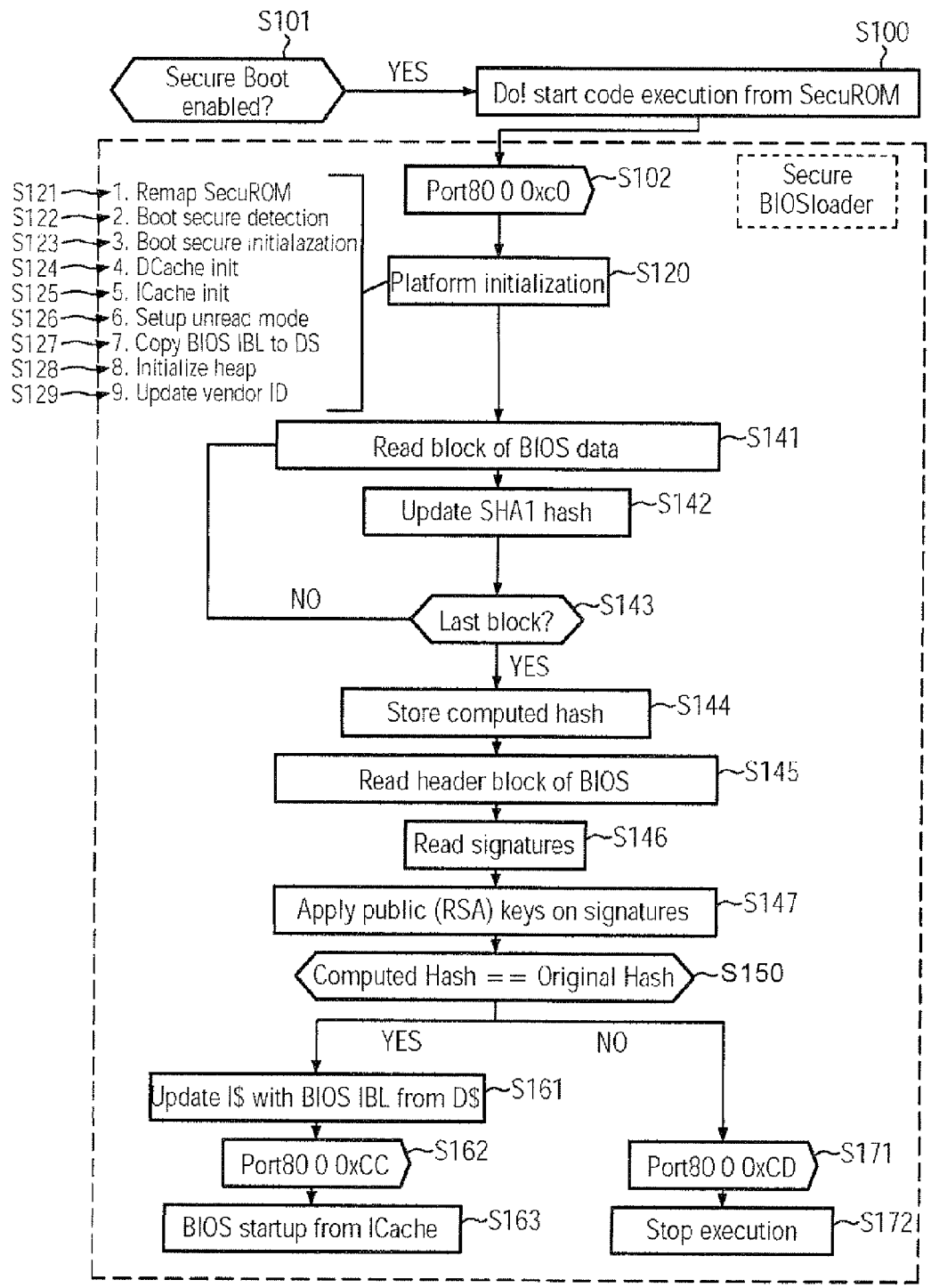
FIG. 1f illustrates a flow diagram describing operation of a computer system including a CPU, such as the CPU of FIG. 1a, according to still other illustrative embodiments.

With reference to FIG. 1e and 1f, operation of the system 150 according to illustrative embodiments will be described in more detail during a secure boot processing. As previously explained, in view of providing a secure platform, a static root of trust may have to be implemented so as to enable a secure start up of an operating system after power-up or reset of the computer system under consideration. For this purpose, a defined execution of the trusted BIOS information 121 may be accomplished by verifying at least the portion 121A on the basis of the trusted set of data 103A, which is substantially resistant against any external manipulation. Thus, each time the system is activated, a secure boot process is initiated, wherein, by using cryptographic methods, integrity verification of the initial hardware and software configuration may be achieved. Hence, upon verifying the integrity of the boot information 121, i.e., in the embodiments shown, the portions 121A, 121B, integrity of the entire boot process may be confirmed, thereby enabling a trusted initialization of an operating system which in turn may be used for performing security sensitive applications. On the other hand, if the integrity test may fail, for instance during verifying of the portions 121A or 121B, an appropriate policy may be applied, for instance, to limit the services provided by the system or, in other illustrative embodiments, by actually disabling the boot processing.

Thus, the secure boot architecture disclosed herein may protect against "class breaks" which are to be understood as attacks that will work against every instance of a given security system. For example, a piece of software generated by an external source may be considered as class break, which may be easy to install and enable circumvention of security/protective measures, thereby enabling unauthorized use of the platform. In digital rights management (DRM) environments, a class break may already be given when the DRM protected data file may be broken once, thereby enabling a redistribution of the unprotected file. Consequently, mechanisms and systems disclosed herein may provide enhanced security with respect to class breaks, since protected environments may be obtained on the basis of an integral portion within the CPU itself, thereby requiring manipulation of the CPU itself, or respective deficiencies in the infrastructure for signing the boot information and maintaining the secret keys, which in both cases may require significant effort in terms of time and money.

FIG. 1e schematically illustrates a flow diagram for describing operation of the system 150. In step S100, the system 150 may be reset or power may be supplied thereto or any other event may occur that may require a secure boot processing. Consequently, an appropriate self-test may be performed by the CPU core 102 and respective components, such as registers and the like, may be initialized. It should be appreciated that, in some embodiments, a secure boot processing may not be enabled, an operating state in which the operating system may stay in control of the system 150. In step S110, the first instruction is fetched from the internal non-volatile memory 103 which may be accomplished by mapping the internal memory 103 to the corresponding reset vector address. Consequently, the CPU 100 starts execution on the basis of the secure data set 103A in any instances in which a jump to the reset vector is caused by any external event. In step S120, the internal random access memory 101 may be initialized caused by the execution of the instructions contained in the set 103A. In step S130, at least a portion of the boot information 121, for instance the portion 121a including a signature thereof, may be loaded into the internal random access memory 101. In step S140, integrity of the boot information 121 or the portion 121A may be verified by using a decryption key contained in the data set 103A.

That is, after initializing the memory 101, the signature check for the boot information 121, or at least the portion 121A, is started. For this purpose, in some illustrative embodiments, hash values may be calculated on the basis of secure hash algorithms, such as SHA1 wherein the one or more signatures for the boot information 121 or the portion 121A may be skipped. Furthermore, additional information, such as the vendor identification contained in the one time programmable memory 130, may be used in some cases and may be included for calculating one or more hash values. The one or more calculated hash values may then be compared to the one or more hash values contained in a dedicated location of the data 121 or 121A, as is also previously described with reference to FIG. 1b. To this end, the hash values from the one or more signatures may be retrieved using the public decryption keys contained in the data set 103A, so as to obtain the initial hash values. If both the calculated hash values and the initial hash values match, the boot information 121, or the portion 121A, is considered trustworthy in step S150, and boot processing is continued in step S160. If the integrity check fails in step S150, in step S170, a corresponding boot failure may be indicated which, in one illustrative embodiment, may be accompanied by terminating the boot processing and issuing a corresponding error code.

In the above-described embodiment, before passing execution to the boot information 121 or the portion 121A, the secure boot process, i.e., the process flow represented by the steps S100-S150, may not apply any reset procedures to any components of the system 150, thereby enabling reliable "measurement" of the hardware configuration of the system 150.

FIG. 1f schematically illustrates a secure boot processing according to still other illustrative embodiments. As shown, in step S101, it may be decided whether or not a secure boot processing is enabled. A respective indication may be obtained by setting respective security bits contained in the memory 130. According to step S100, execution is started from the non-volatile memory 103, as previously explained. In step S102, status information may be provided, for instance, for appropriately setting an output port. For example, in step S102, it may be indicated that secure boot processing is started during the internal self-test. In step S120, the system 150 and in particular the CPU 100 may be initialized, which may, for instance, comprise one or more of the steps S121-S129. For example, in step S121, the addresses of the memory 103 may be appropriately remapped so as to ensure that the very first instruction will be fetched from the memory 103. In step S122, a boot source may be detected and may be initialized in step S123. Furthermore, the memory 101, i.e., the data cache 101A and the instruction cache 101B, may be initialized in steps S124, S125, and unreal mode for the data cache may be set up in step S126. Furthermore, an image of the boot information 121 or of the portion 121A may be copied into the data cache 101A and, in step S128, storage space may be assigned for variables in the data cache 101A. Finally, if required, in step S129, the vendor identification may be retrieved.

In step S141, a block of the boot information 121 or portion 121A is read and, in step S142, a respective hash algorithm may be performed so as to obtain a first hash value. In step S143, it is determined whether or not the previously read block of data was the last block or not. If not, the process flow moves back to step S141 to read in a further block of data and in the subsequent step S142 a hash value is calculated and updates the previously obtained value. When, in step S143, the last block is read, in step S144, the computed hash value is stored and, in step S145, a relevant portion of the data 121 or 121A may be read so as to obtain the signatures contained therein. For example, the header block of the information 121 or of the portion 121A may be used for this purpose. In step S146, the one or more signatures are retrieved and, in step S147, one or more public keys are applied to decipher the signatures obtained in step S146. In step S150, the hash value or values stored in step S144 may be compared with the original hash values obtained by performing step S147, thereby deciding whether the data 121 or 121A are considered trustworthy or not.

If the hash values match in step S150, the previously initialized instruction cache may be updated with the boot data 121 or 121A, which is presently contained in the data cache 101A, so as to verify the boot data therein. In step S162, the status of the secure boot process may be indicated and finally, in step 163, the booting may be continued by performing instructions from the instruction cache, which may, for instance, include initialization of the system memory 110, the retrieval of any remaining portion of the boot data 121, such as the portion 121B, and the verification of the integrity thereof by calculating a hash value and comparing the calculated hash value with an original hash value included in the portion 121A. When integrity is not confirmed in step S150, in step S171, a corresponding status information (for example, 0xCD) may be provided and in step S172, in one illustrative embodiment, execution may be terminated.

As a result, the systems and mechanisms disclosed herein provide enhanced integrity of computer platforms by providing a secure boot processing on the basis of a pre-boot routine contained in a non-volatile memory, which may not be overwritten once data are programmed into the non-volatile memory. Since the non-volatile memory is a part of the CPU itself, system initialization may be accomplished on the basis of the pre-boot information stored in the non-volatile internal memory, which may also include appropriate decryption keys that may be applied to a signed boot information or at least to a signed portion of the boot information. The process for calculating appropriate hash values for the boot information or a portion thereof and a comparison with originally created values stored in encrypted form in the boot information may be accomplished by using the internal random access memory of the CPU, thereby preventing the possibility of external access and thus the possibility of manipulating the system configuration. Hence, the internally stored pre-boot information may be used as a core root of trust for measurement during system initialization.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method for starting a computer system, the method comprising:

accessing a first set of data stored in a non-volatile memory area of a central processing unit, said first set of data including first instructions causing a core circuit of said central processing unit to initialize a random access memory of said central processing unit and verify an integrity of at least a first portion of said first instructions;

executing a second portion of said first instructions to verify said integrity of said at least a first portion of said first instructions;

loading an image of a second set of data from a non-volatile memory into said initialized random access memory responsive to verifying said integrity of said first portion of said first instructions, said second set of data comprising a signature for verifying an integrity of said second set of data, said second set of data further comprising second instructions causing said central processing unit to initialize a system memory of said computer system;

verifying said integrity of said second set of data by using said signature and a decryption key included in said first set of data; and initializing said system memory using said second instructions responsive to verifying said second set of data.

2. The method of claim 1, further comprising loading a third set of data from said non-volatile memory into said system memory and verifying an integrity of said third set of data.

3. The method of claim 2, further comprising executing third instructions included in said third set of data, said third instructions causing an operating system to be loaded into said system memory from a bootable device connected to said computer system.

4. The method of claim 1, wherein initializing said random access memory comprises initializing a data cache and an instruction cache of said central processing unit and wherein said second data of data is loaded into said data cache.

5. The method of claim 4, further comprising copying said second set of data into said instruction cache when integrity of said second set of data has been verified successfully so as to execute said second instructions.

6. The method of claim 1, wherein loading said second set of data into said random access memory comprises performing a hash algorithm to determine a hash value of said second set of data.

7. The method of claim 6, wherein verifying an integrity of said second set of data comprises comparing said hash value of said second set of data with an initial hash value obtained by applying said encryption key to said signature.

8. The method of claim 1, wherein said first set of data is accessed whenever said central processing unit is reset or powered up.

9. The method of claim 1, further comprising remapping addresses of said first set of data within a virtual address space of said central processing unit so as to allow external access to at least said decryption key after successful verification of said second set of data.

10. The method of claim 1, further comprising providing status information on at least a verification status of said second set of data.

11. The method of claim 2, wherein verifying integrity of said third set of data comprises determining a hash value for said third set of data and comparing said determined hash value with an initial hash value of said third set of data contained in said second set of data.

12. The method of claim 2, further comprising copying said first set of data into said system memory.

13. A method for starting a computer system, the method comprising:
upon at least one of a power up event and a reset event, accessing an internal non-volatile memory of a central processing unit, said internal non-volatile memory containing pre-boot instructions and data values for initializing an internal volatile memory of said central processing unit and verifying an integrity of at least a portion of boot instructions and boot data values stored in a non-volatile memory;
loading said at least a portion of said boot instructions and boot data values from the non-volatile memory into said internal volatile memory by executing said pre-boot instructions directly from said internal non-volatile memory;
verifying integrity of said at least a portion of said boot instructions and boot data values by executing said pre-boot instructions directly from said internal non-volatile memory; and
after successfully verifying integrity of said at least a portion of said boot instructions and boot data values, executing said boot instructions.

14. The method of claim 13, wherein executing said boot instructions comprises initializing a system memory of said computer system and loading a second portion of boot instructions and boot data values into said system memory.

15. The method of claim 14, further comprising verifying integrity of said second portion and continuing booting of said computer system on the basis of said second portion when verification of said second portion is successful.

16. The method of claim 13, wherein initializing said volatile internal memory comprises initializing a data cache of said central processing unit and wherein said at least a portion is loaded into said data cache and is verified therein.

17. The method of claim 16, further comprising initializing an instruction cache of said central processing unit and copying said at least a portion into said instruction cache and executing said boot instructions when said at least a portion has been verified successfully.

18. The method of claim 13, further comprising performing at least one of remapping and copying said pre-boot instructions and data values so as to enable external access to at least said pre-boot data values after successful verification of said at least a portion of the boot instructions and data values.

19. A central processing unit (CPU), comprising:
a substrate having formed thereon circuit elements defining a CPU core, an internal volatile memory, an internal non-volatile memory, and a bus system for connecting said CPU core, said internal volatile memory, and said internal non-volatile memory; and
pre-boot information stored in said internal non-volatile memory, said pre-boot information including instructions executable by said CPU core and data values for initializing said internal volatile memory and verifying at least a portion of a boot routine, wherein said CPU core is operable to execute said pre-boot instructions directly from said internal non-volatile memory to initialize said internal volatile memory, verify integrity of at least a portion of said boot routine, and, after verifying the integrity of said at least a portion of said boot instructions, load said at least a portion of said boot instructions into said initialized internal volatile memory and execute said boot instructions.

20. The central processing unit of claim 19, wherein said pre-boot information includes one or more decryption keys configured to enable deciphering of a signature of said at least a portion of said boot routine.

21. The method of claim 1, further comprising executing said second portion of said first instructions to verify said integrity of said first portion of said first instructions directly from said non-volatile memory area.

22. The method of claim 1, further comprising:
executing said portion of said first instructions to initialize said random access memory directly from said non-volatile memory area;
copying a portion of said first set of data to said initialized random access memory; and
executing said portion of said first instructions to verify said integrity of said first portion of said first instructions using said portion of said first set of data copied to said initialized random access memory.

* * * * *